Feb. 8, 1955   N. ANTON   2,701,835
PLASTIC CUTTING TOOL AND CUTTING TIP THEREFOR
Filed April 14, 1953   2 Sheets-Sheet 1
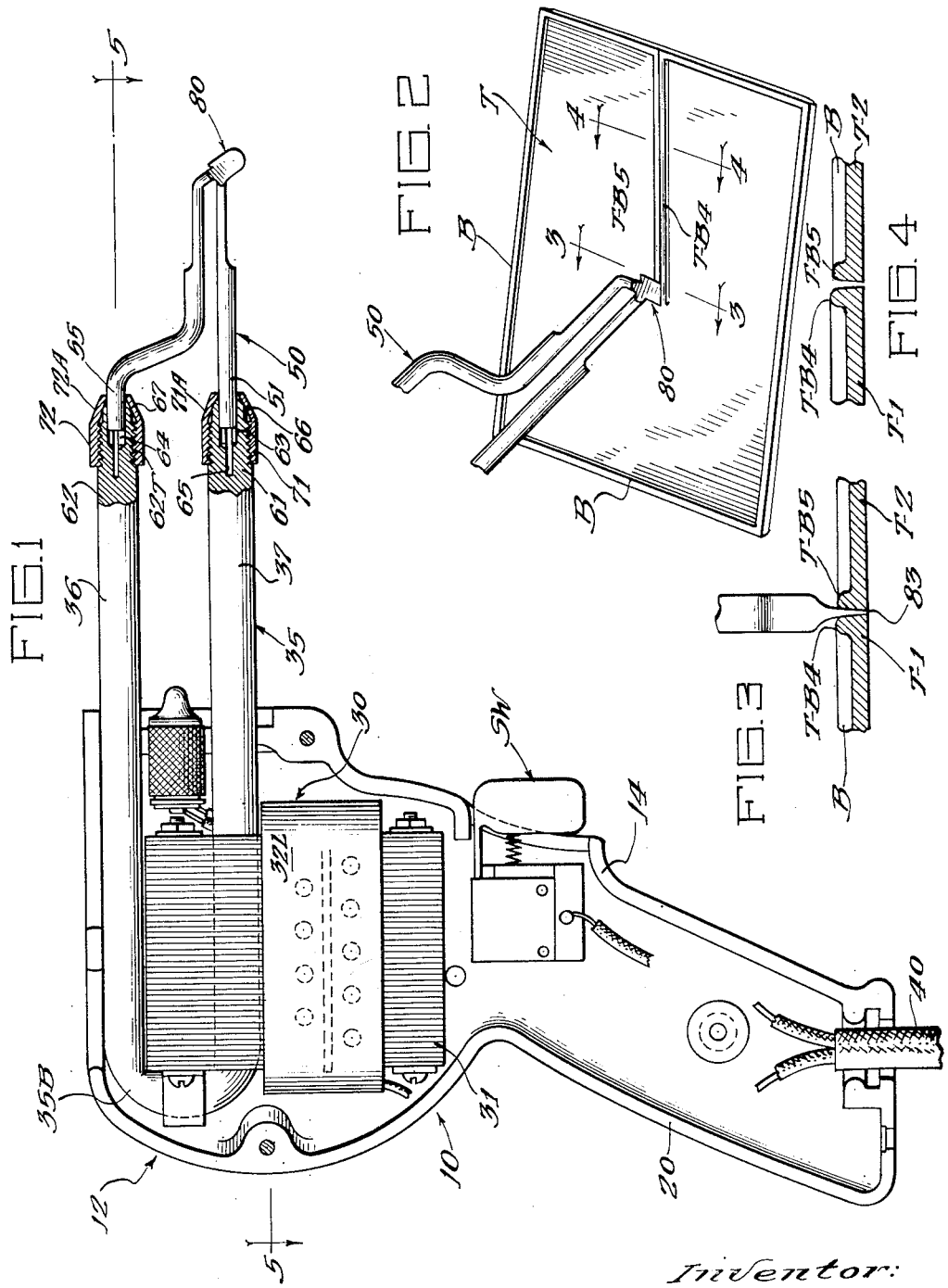
Inventor:
Nicholas Anton
By Wallace and Cannon
Attorneys Feb. 8, 1955  N. ANTON  2,701,835
PLASTIC CUTTING TOOL AND CUTTING TIP THEREFOR
Filed April 14, 1953  2 Sheets-Sheet 2
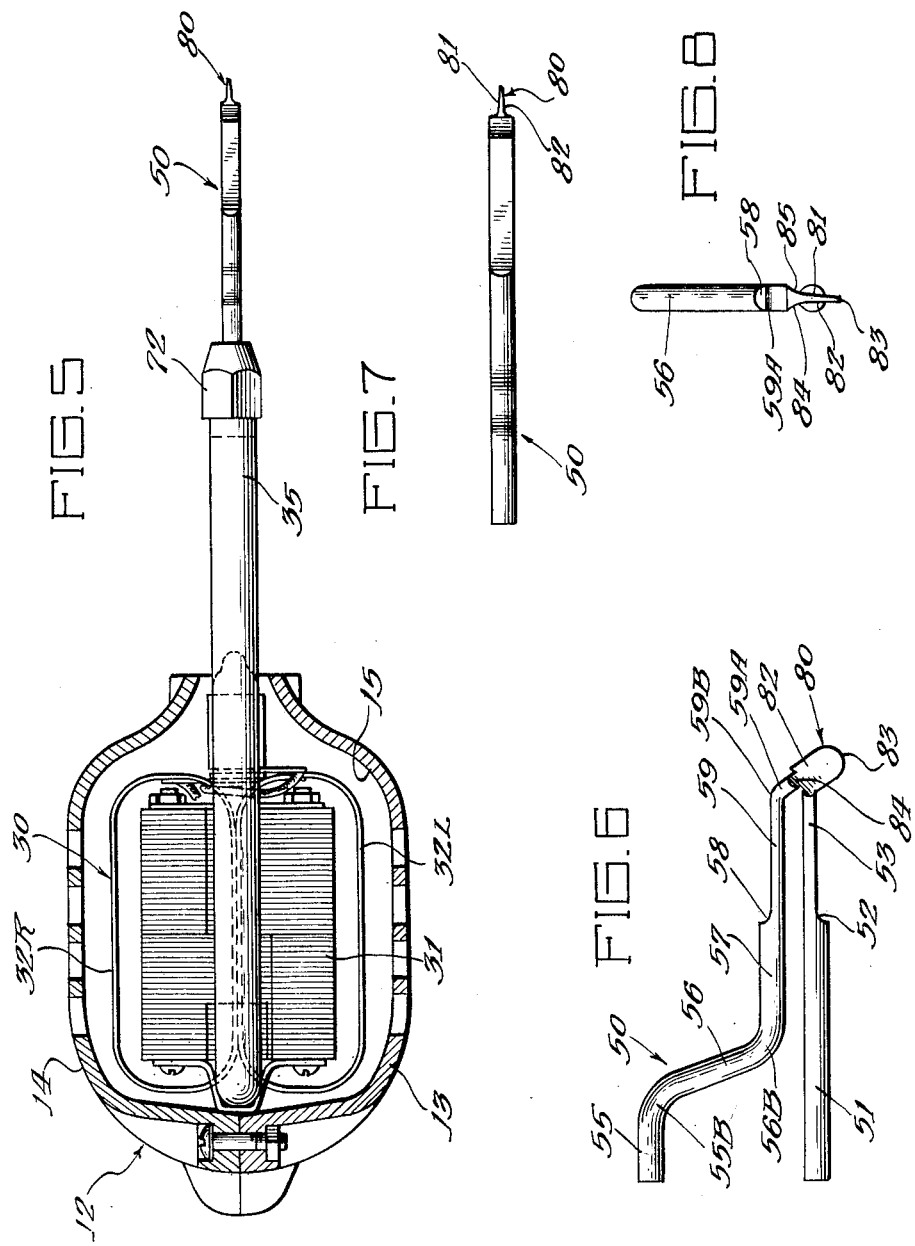
Inventor:
Nicholas Anton
By Wallace and Cannon
Attorneys

United States Patent Office 2,701,835
Patented Feb. 8, 1955

2,701,835

PLASTIC CUTTING TOOL AND CUTTING TIP THEREFOR

Nicholas Anton, Park Ridge, Ill.

Application April 14, 1953, Serial No. 348,713

3 Claims. (Cl. 219—29)

This invention relates to cutting tools for thermoplastic materials, such as thermoplastic wall tile and the like, and more particularly to a cutting tool that is adapted to cut by means of a melting, or thermal deforming, action.

Much interior construction work today utilizes so-called tile blocks, such as of asphalt or vinyl plastic, in one form or another. The type of tile is arranged side-by-side in a regular pattern either as a wall or floor construction, particularly in bathrooms and kitchens and also generally where panel radiant heat is utilized in the floor structure.

In cutting or trimming such tile blocks to conform to space requirements, the usual practice in the past has been to employ a conventional cutting edge such as afforded by a guillotine knife. This operation is particularly common in the case of vinyl tile which is relatively thin and which has a firm rigid glaze surface, and it will be recognized that there is little versatility in this operation when considered from the standpoint of curved or angled cuts that may be necessary in many instances.

Thus, with present methods and techniques, straight line cuts are about the only type that can be made on plastic tile with any speed at all, and even so, these cuts, unless additional tools of a highly specialized nature are used, must be made at right angles to the sides of the tile block. For instance, no interior wall is ever perfectly straight, and at the corners of a room where small pieces of plastic tiling are required consideration must be taken of this defect. However, in attempting to conform tile pieces to conditions such as this, it is difficult to obtain angular or diagonal cuts with a guillotine knife, and of course circular cuts are virtually impossible with such a tool. Moreover, the cutting edge must be maintained exceedingly sharp in order to reduce the possibility of fracturing the tile which is relatively thin.

The primary object of the present invention is to devise a different technique for cutting thermoplastic plastic tile such as vinyl tile, or the like, so that the method of the prior art together with its defects as outlined above may be altogether eliminated and dispensed with. Another object of the invention in this regard is to devise a different type of cutting tool, one which operates on the principle of melting the material to be cut, so that the tool possesses complete versatility in being capable of cutting along any given curve or angle relative to the sides or edges of the tile block.

In laying tile block, the blocks are adhered to the supporting surface by mean of a waterproof mastic or adhesive which in many instances is brushed onto the back of the tile, and a further object of the present invention is to facilitate and increase the efficiency and application of mastic or adhesive to the back of cut tile blocks prior to laying the same.

Another object of the present invention is to facilitate and expedite the laying of tile through the use of a thermally operating cutting tool that is also adapted to improve the appearance of the tile and the efficiency of its attachment to the supporting surface, such as a wall.

A further object of the present invention is to afford an electrically operated cutting tool having a readily detachable and renewable cutting implement.

Other and further objects of the present invention will be apparent from the following description and claims and are illustrated in the accompanying drawings which, by way of illustration, show a preferred embodiment of the present invention and the principle thereof and what I now consider to be the best mode in which I have contemplated applying that principle. Other embodiments of the invention embodying the same or equivalent principles may be used and structural changes may be made as desired by those skilled in the art without departing from the present invention.

In the drawings:

Fig. 1 is a side elevation of a cutting tool embodying the principles of the present invention, certain parts being shown in section;

Fig. 2 is a perspective view illustrating the manner in which the tool of the present invention may be used in a cutting operation;

Figs. 3 and 4 are sectional views taken substantially and respectively on the lines 3—3 and 4—4 of Fig. 2;

Fig. 5 is a sectional view taken on the line 5—5 of Fig. 1;

Fig. 6 is an elevational view of a cutting implement embodying the principles of the present invention;

Fig. 7 is a plan view of the implement shown in Fig. 6; and

Fig. 8 is a front elevation of the implement shown in Fig. 6.

The present invention is illustrated in Figs. 1 to 8 as embodied in the form of a hand operated tool or gun generally indicated at 10 as including a cutting implement 50 operatively connected thereto. The cutting tool 10 is of the type described and claimed in my co-pending application Serial No. 284,990, filed April 29, 1952, now Patent No. 2,680,187, issued June 1, 1954, and thus includes a molded plastic casing 12, Fig. 5, consisting of complementary joined sections 13 and 14 that afford a hollow interior structure. The two sections 13 and 14 when thus connected together afford an upper housing 15, Fig. 2, and an integral handle section 20, Fig. 1, depending therefrom. The handle section 20 is of a size and configuration to be gripped in the hand of the operator so that the operator can conveniently place his index finger on a trigger switch SW that is operatively arranged in the tool 10. This switch SW controls the opening and closing of a set of switch contacts for a transformer 30, and the principle of operation in this regard is fully described in the above identified co-pending application.

The internal housing 15 is of a size and arrangement to accommodate the transformer 30, and this transformer 30 includes a pair of opposite primary coils or windings 32L and 32R wound on a conventional soft iron core 31.

Embracing the top of the transformer core 31, as shown in Figs. 1 and 5, is the secondary coil of the transformer, such coil being in the form of a relatively large copper rod 35 which is U-shaped in outline, and the arrangement is such that the bight 35B of the rod-like secondary coil 35 embraces the top of the iron core 31 at the rear thereof with the upper and lower legs 36 and 37 of the coil 35 disposed in vertically spaced relation. The secondary coil 35 extends forwardly through the housing 15 in the casing 12 so that the casing 12 and the secondary coil together give the tool 10 the appearance of a pistol.

A conductor cord 40 is arranged at the base of the handle 20 as described in the above identified co-pending application, and this conducting cord 40, when connected to source, is adapted to energize the transformer 30 when the switch SW is closed by the operator. Thus, when the switch SW is closed, and the cord 40 connected to a suitable source of electricity to thereby complete a circuit to the transformer 30, the secondary coil 35 will also be energized and, being in the form of an electrical resistance element, will be heated in a well known manner. As will be described in detail below, the closing of a circuit in this manner will also cause the cutting implement 50 to be heated, and in accordance with the present invention this condition characterizes the utility of the tool 10. It will be seen therefore that the transformer 30 and the specialized secondary coil 35 thereof represent a means for effecting a quick and rapid heating of the cutting implement 50.

Under and in accordance with the present invention, flexible composition floor covering such as vinyl plastic or asphalt tile or the like can be cut or trimmed by means of direct engagement therewith by the cutting implement 50. The cutting implement in the present instance is in the form of a rod-like element of copper connected in electrical series to the secondary coil 35. This resistance element 50 is shaped from a single piece of copper rod of substantially less diameter than the rod 35, about 0.162 inch, and is of a modified U or V shape as shown in the drawings. Thus, the cutting implement 50 comprises at one end a pair of tubular legs 51 and 55 that are spaced apart from one another a distance corresponding to the distance that separates the rounded, rod-like legs 36 and 37 of the coil 35, and these legs 51 and 55 are adapted for removable connection thereto as will be described below.

As particularly described in my said co-pending application, end portions 61 and 62 of the coil 35 are provided with axial bores as 63 and 64, respectively, extended part way therethrough, and these bores are each formed with slots as 65 which extend transversely from one side to the other at the end portions 61 and 62. The bores as 63 and 64 are of a size to slidably receive the free ends of leg elements 51 and 55 of the cutting implement 50, and the transverse slots 65 each permit an adjustable clamping action to be exerted upon these free ends of the cutting implement 50. In this manner, the latter can be removably attached to the coil 35 and identified electrically with the transformer 30 as part of the secondary coil thereof.

In order that such a clamping action may be effected, the spaced apart ends 61 and 62 of the coil 35 are each beveled or tapered at 66 and 67, and the outer periphery of these end portions of the coil 35 are threaded as at 62T, being thus adapted to threadedly mount and receive a set of hollow retaining nuts 71 and 72. The ends of the retaining nuts 71 and 72 corresponding to the leg elements 51 and 55 of the cutting implement 50 are tapered as at 71A and 72A, respectively, the slope of these tapered ends upon the inner faces thereof being the same as the slope of the tapered ends 66 and 67 of the coil 35. The nuts 71 and 72 are formed with an opening at the tapered ends thereof so that the legs 51 and 55 of the cutting implement 50 may be slidably extended therethrough and into the bores as 63 when the nuts 71 and 72 are loosely mounted in position. Thus, when the nuts 71 and 72 are in a loose relation on the secondary coil, the implement 50 may be slidably fitted in the mounting bores as 63, whereupon by tightening the nuts 71 and 72 on the end portions 61 and 62, the cooperating tapered portions as 66 and 71A, referred to above, effect a gradually increasing clamping action on the legs of the leg elements 51 and 55 within the bores 63, and in this manner the cutting implement 50 is removably mounted on the secondary coil so as to be in electrical series therewith.

From this it will be readily apparent that energization of the transformer 30 will produce an $I^2R$ heating effect in the secondary coil 35 which in turn will be transmitted to the cutting implement 50 that is attached thereto.

The cutting action of the implement 50 under and in accordance with the present invention is one of melting, that is, a thermal deforming action on the material being cut. Thus, a flattened tip 80 is formed at the end of the cutting implement 50 of a configuration such that it affords a relatively dull or blunt cutting edge 83 adapted to be heated electrically by closing the switch SW. In affording the cutting tip 80, the upper leg 55 of the cutting implement 50 is first bent down at an acute angle at 55B to provide a downwardly inclined forward leg section 56, Fig. 6, which, in turn, is then bent out at 56B in a horizontal relation to provide another forward leg section 57 extended in parallel relation to the lower leg element 51. Thus, the relative distance between the leg elements 51 and 55 is substantially reduced in this manner to afford a stable cutting structure. In order to adapt the implement 50 for quick heating by electrical resistance, the cross sectional areas of the leg element 51 and the leg section 57 are substantially reduced to about 0.08 inch at 52 and 58 respectively to provide forwardly extended leg sections 53 and 59 that are about half the diameter of the leg elements 51 and 55.

Toward the forward end of the cutting element 50, the upper leg section 59 is bent down sharply at 59B to provide an inclined leg section 59A, and at the point where this downwardly inclined leg section 59A joins the forwardmost end of the lower leg section 53 the cutting implement 50 is made flat in a well known manner, as by drawing, so as to provide a cutting tip or end 80 about three-sixteenths inch wide.

As shown in Figs. 7 and 8, the cutting tip 80 is formed so as to have an inclination of approximately 45° relative to the axes of the two opposite forward leg sections 53 and 59, and so as to have at the same time a rounded and relatively blunt cutting edge 83. In this connection, it should be pointed out that the manner of providing the cutting tip 80 is preferably such as to provide opposite side sections 81 and 82 that flare out slightly rearwardly and then on a smaller radius at 84 and 85 where the rear of the cutting tip 80 meets the forwardmost ends of the legs sections 53 and 59A.

It will be realized that when the gun 10 is energized by closing the switch SW, the secondary coil 35 of the transformer 30 will conduct a current of electricity into and through the cutting implement 50. This current, of course, will be established in the cutting tip 80 so that the latter will become intensely hot, almost instantly, as a result of the resistivity of the copper material of which the implement 50 is made, and also as a result of the reduced-diameter leg sections.

The plastic-like flooring material T to be severed or trimmed in accordance with the present invention is placed face down on a flat metallic or glass surface with the edge beads as B at the opposite side edges of the tile block turned up. Just prior to engaging the tile block as T which is to be cut with the cutting edge 83, the switch SW for the transformer 30 is closed so that the tip 80 will have attained its optimum heat content when the cutting edge 83 engages the back side of the tile material. The hot cutting edge 83 will melt the tile, and as the operator draws the tool along the dividing line on the back of the tile block to be cut, the hot cutting tip 80 melts, or thermally deforms, the edges of the material T on either side of the cutting line to divide the tile into two sections as T–1 and T–2.

Simultaneously with the severing action of the tool 10, the tile material along either cut edge of the two sections as T–1 and T–2 assumes a folded, curled, or welt-like shape, resulting in the establishment of edge seal beads as T–B4 and T–B5 so that two tile sections T–1 and T–2 each have an edge bead along either opposite edge. Edge cavities as C–1 and C–2 are of course formed along the inside of the beads T–B4 and T–B5 as the result of this phenomenon, and in this manner subsequent application of the mastic or adhesive, used to adhere either or both of the sections T–1 and T–2 to the supporting surface, is facilitated and improved.

In the event that the cutting element 50 becomes dull or otherwise inefficient through extended use, it will be realized the same may be readily detached from the ends of coil 35 simply by loosening the retaining nuts 71 and 72. In this manner, the cutting edge 83 may be renewed or the implement 50 replaced altogether if found necessary.

In forming the cutting end 80, it has already been pointed out above that the width thereof is preferably approximately three-sixteenths inch. In this same connection, the cutting edge 83 should preferably be about 0.020 inch thick with the sides 81 and 82 flared out to a thickness of about 0.025 inch at the juncture with the widely flared side sections 84 and 85. This dimensional relationship is best illustrated in Fig. 8, and has been found to assure in the first instance the most efficient relation for effecting a rapid heating, by electrical resistance, of the cutting end 80.

The tool 10 of course is relatively heavy and this coupled with the heat content of the cutting tip 80 when the tool 10 is in use causes the hot cutting edge 83 to quickly penetrate and cleanly sever the material being cut along any given line, curved or straight. The cutting operation is therefore very fast, efficient, and extremely versatile, and the inclination of 45° described above as preferably imparted to the cutting tip 80 greatly reduces fatigue in the operator's wrist as can be best appreciated from the cutting relation illustrated in Fig. 2.

The cutting implement 50 preferably consists of copper because this metal combines desirable characteristics of resistivity, specific heat, ability to be worked, and the like. To strengthen and rigidify the drawn copper cutting end 80, the latter is preferably provided with an iron electroplate about 0.001 inch to 0.002 inch thick, and the entire cutting implement 50 is then preferably given a flash coating of silver which assures good conduction and electrical contact with respect to the coil 35 and which at the same time guards against corrosion of the copper metal and the iron plating.

From the foregoing, it will be seen that the present invention affords an entirely new type of tool for cutting thermoplastic tile material and permits complete versatility with respect to the configuration of the cut edge of the tile. The cutting edge of this tool need not be maintained sharp, and hence expense in this regard is eliminated altogether, and the cutting implement may be easily repaired or replaced when and if necessary.

I claim:

1. A tool for thermally cutting material such as thermoplastic tile blocks or the like comprising, a casing affording a hollow housing for holding a transformer, an integral pistol grip handle depending from said casing, a transformer mounted in said housing, the secondary coil of said transformer being in the form of a rounded and relatively large one-piece U-shaped metallic rod bent around the core of the transformer in said housing so as to afford a pair of vertically spaced leg elements having aligned ends projecting in a forward direction from the housing, and a cutting implement in the form of an electrical resistance element attached to the secondary coil so as to be heated electrically thereby, said cutting implement having a pair of rounded leg elements of less diameter than said latter elements of the secondary coil and joined together in the form of an apex at the forward end of the implement, the rear ends of the cutting implement leg elements being removably connected, respectively, to the said aligned ends of the secondary coil leg elements, said apex of the cutting implement being inclined at an angle of about 45° and flattened substantially in the form of a tapered cutting end having a relatively dull cutting edge about 0.020 inch thick and which is flared gradually downwardly toward the rear thereof to a thickness of about 0.025 inch and then more sharply to an even greater thickness thereby affording a high electrical resistance.

2. An implement for thermally cutting material such as thermoplastic tile or the like comprising, a generally V-shaped tubular electrical resistance element adapted to be heated electrically, said resistance element including a pair of leg elements joined at the apex end of the implement to afford a cutting end and spaced apart from one another at their free ends for connection to a source of electricity, said leg elements at their apex end being flattened substantially and inclined at an angle of about 45° to afford a cutting edge having a thickness exceeding substantially 0.020 inch, said cutting edge being flared out gradually to a greater thickness of about 0.025 inch in the direction of said free ends to provide an optimum heating effect, and the leg elements being substantially reduced in diameter adjacent said flattened apex end so as to increase the electrical resistance of said implement and thereby assure a more rapid heating of the cutting end.

3. An implement according to claim 2 consisting of copper metal and having a strengthening electroplate of iron about 0.001 inch to 0.002 inch thick on the cutting end thereof and having a flash coat of silver thereover.

References Cited in the file of this patent

UNITED STATES PATENTS

| | | |
|---|---|---|
| 1,948,075 | Miyaoka | Feb. 20, 1934 |
| 2,185,266 | Raffles | Jan. 2, 1940 |
| 2,200,322 | Arnesen | May 14, 1940 |
| 2,359,393 | Sloan | Oct. 3, 1944 |
| 2,491,931 | Raker et al. | Dec. 20, 1949 |
| 2,501,192 | Scholler | Mar. 21, 1950 |
| 2,574,440 | Smith et al. | Nov. 6, 1951 |

OTHER REFERENCES

American Machinist Publication dated June 26, 1950 (page 141).